March 8, 1955 J. F. GORDON 2,703,862
GENERATOR FREQUENCY STABILIZING SYSTEM
Filed June 15, 1951 2 Sheets-Sheet 1

JAMES F. GORDON
*INVENTOR.*

BY
*Killman and Kerst*
*ATTORNEYS*

March 8, 1955  J. F. GORDON  2,703,862
GENERATOR FREQUENCY STABILIZING SYSTEM
Filed June 15, 1951  2 Sheets-Sheet 2

JAMES F. GORDON
*INVENTOR.*

BY
*Killman and Kerst*
ATTORNEYS

United States Patent Office 2,703,862
Patented Mar. 8, 1955

2,703,862

GENERATOR FREQUENCY STABILIZING SYSTEM

James F. Gordon, Towson, Md., assignor to Bendix Aviation Corporation, Towson, Md., a corporation of Delaware Application June 15, 1951, Serial No. 231,793

7 Claims. (Cl. 322—32)

This invention relates generally to the generation of frequency and phase stabilized currents and more particularly to an electro-mechanical system for obtaining such currents with a high degree of precision.

Various systems have been proposed in the past in which an electro-mechanical device is used to provide electrical outputs of one or more frequencies and in which one of the output signals is used to stabilize the prime mover or other frequency controlling device. These systems, while satisfactory for some purposes, do not provide the exact precision control required in many applications due to inherent limitations in the method of obtaining error information of a precise nature and the effect of the fluctuations in other variables present in the system.

It is an object of the present invention to provide a new and improved frequency and phase stabilized generating system.

Another object of this invention is to provide an electro-mechanical system having a precision time synchronized error signal generator for controlling the operation thereof.

A further object is to provide an improved generator control system which is insensitive to fluctuations in the generated signal amplitude, wave shape or the like.

Another object of this invention is to provide a precision stabilized system for generating phase locked signals of predetermined frequencies and which can be accurately adjusted to obtain any desired phase relation therebetween.

These and other objects of the present invention are obtained by providing an A. C. motor-generator system wherein the speed of the motor is maintained at a constant value by means of a time discriminator acting to control the frequency of the driving energy supplied to the motor. This frequency is controlled by a stable source of oscillatory energy acting with the time discriminator to maintain a predetermined relation between the frequency generated by the system and the stable source.

A preferred embodiment of the present invention is shown in the drawings wherein.

Figure 1:
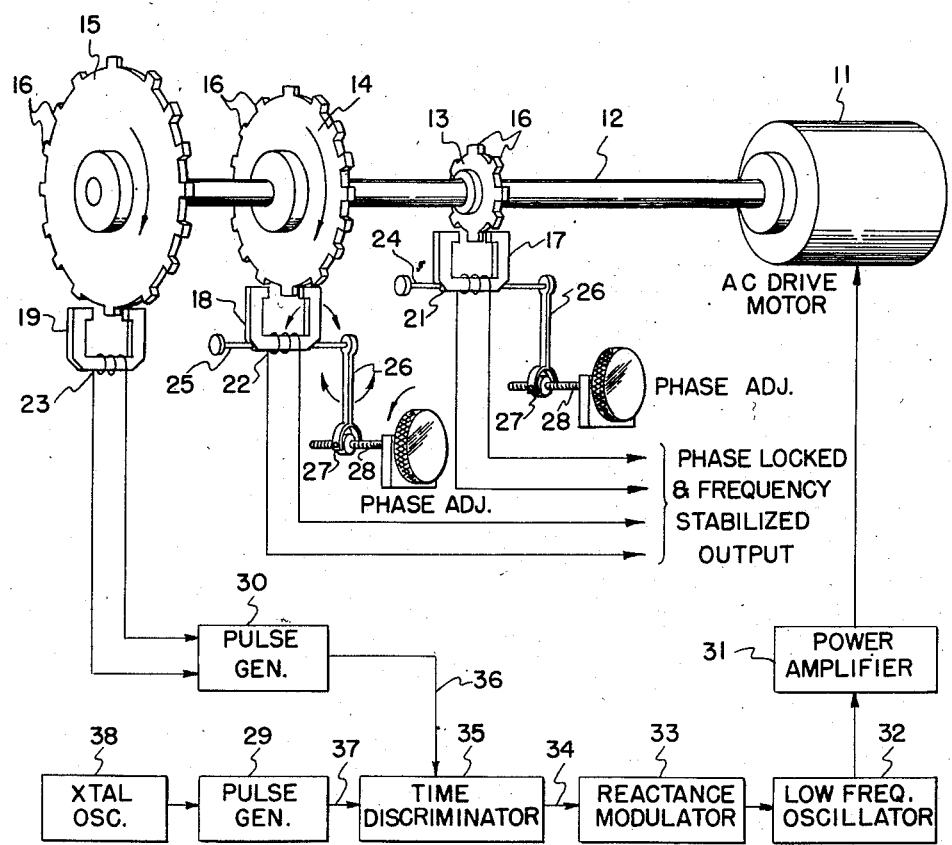
Fig. 1 is a perspective view of the electro-mechanical system of the invention with the control circuits represented in block form.

Referring to Fig. 1 there is shown a motor 11 which drives shaft 12 to turn rotors 13, 14 and 15 of individual generators. The motor 11 has a rotational speed which is controlled by the frequency of the A. C. power used to energize the motor which may be, for example, an induction motor. The rotors 13–15 comprise toothed wheels, the teeth 16 thereof being made of magnetic material and the main body of the rotor, other than the teeth 16, may be of non-magnetic material if desired. The rotors 13, 14 and 15 pass through poles provided by stators 17, 18 and 19, respectively, and induce voltages in corresponding stator windings 21, 22 and 23. These voltages may be generated, for example, by having the teeth 16 be of permanent magnet structure or by providing the teeth as permeable bodies which pass through the air gap of core 19, which itself provides the field in the air gap from a magnetizing current flowing in the respective windings or otherwise.

The rotors 13 and 14 provide a different number of teeth passing their respective air gaps at the stators 17 and 18 per revolution of shaft 12 and thus generate, in coils 21 and 22, frequencies which bear any desired relation to each other in accordance with the ratio between the number of teeth on each wheel. The rotors 13 and 14, being rigidly fixed to the shaft 12, provide the generation of these frequencies with substantially no phase variation therebetween. Adjustment of the relative time-phase between these two signals is provided by varying the stators 17 and 18 around axes 24 and 25, respectively, by means of a suitable linkage such as arm 26 driven by a follower 27 in threaded engagement with a screw 28. The term "time-phase" as used in this specification with reference to two generated signals refers to the relative displacement of the two signals with respect to a time reference base line.

The motor 11 is energized from a power amplifier 31. The motor rotates at a speed determined by the frequency of energy supplied from the power amplifier 31 which in turn is driven by a low frequency oscillator 32. The frequency of operation of the oscillator 32 is controlled by a reactance modulator 33. The modulator 33 operates to provide a frequency controlling impedance to oscillator 32 which varies in accordance with signals supplied to the input 34 thereof. The signals at the input to the modulator 33 are derived in accordance with the present invention by means of a time discriminator 35 having input circuits 36 and 37, and which produces an output signal at 34 which accurately is a measure of the time variation between the two input signals provided at 36 and 37, respectively. In order to maintain the speed of motor 11 such that the generated frequencies will have the exact value desired, the time discriminator is energized by a pulse generator 29 which is energized from a reference source, such as a crystal oscillator 38, and from the signals from a pulse generator 30 generated in response to the voltage generated by the rotation of the rotor 15 in the winding 23. In this manner the system operates to produce a signal output at 34 which controls the frequency of oscillator 32, and thus the speed of motor 11, such that the frequency generated in winding 23 bears an exact relation to that generated by the reference source 38. In this manner the frequencies of the signals generated in coils 21 and 22 are provided stabilized with respect to the reference 38, as well as with respect to each other.

Figure 2:
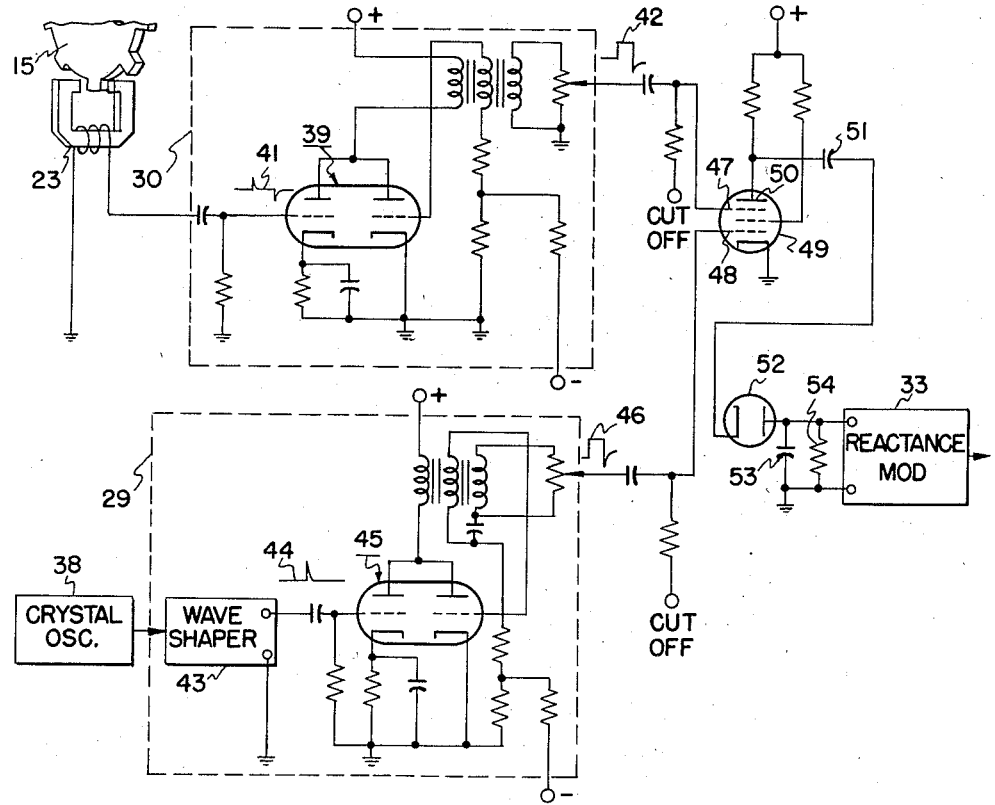
Fig. 2 is a schematic diagram of the control circuits.

Referring to Fig. 2 for the details of the synchronizing system there is shown the winding 23 energizing pulse generator 30 by supplying to the input circuit of a blocking oscillator generally designated 39 short pulses of energy 41 generated by the wheel 15. The pulses 41 may be obtained with the desired degree of sharpness by suitable means, for example, by differentiation. The blocking oscillator 39, for the positive impulse of signal 41, produces one cycle of operation and provides an output signal 42 which is characterized by its square shape and constant amplitude. The oscillator 39 thus provides pulses 42 of constant time-phase relation with the pulses 41.

The crystal oscillator 38 energizes pulse generator 29 which includes a wave shaper 43 which provides sharp positive voltage pulses 44 at a precise point in each cycle of the oscillations of oscillator 38. The pulses 44 energize the input of a second blocking oscillator generally designated 45 which produces in its output a pulse 46 of constant time-phase relative to pulses 44 and substantially similar in shape to pulse 42. The pulses 46 and 42, are amplitude limited in that their amplitude is a constant value regardless of the amplitude of the signal inputs to the respective blocking oscillators, provided only that the input signals are of sufficient magnitude to trigger the operation thereof. A coincidence tube 49 having plate 50, suppressor grid 47 and control grid 48 is provided to utilize the pulse signals. The pulses 46 and 42 are applied to the suppressor grid 47 and the control grid 48, respectively, of the tube 49, which is provided with biases on grids 47 and 48, respectively, which maintain the tube in a non-conducting condition regardless of the signals individual to either grid unless such signals occur in time coincidence. The output from tube 49 is coupled from the plate 50 by a condenser 51 and a diode 52, and appears across a condenser 53 which is shunted by a resistor 54. The condenser 53 is connected to the reactance modulator 33 to control the reactance thereof in accordance with the voltage thereacross. The values of condenser 53 and resistor 54 are such that the voltage thereacross is proportional to the area value of the signals from anode 50.

Figure 4:
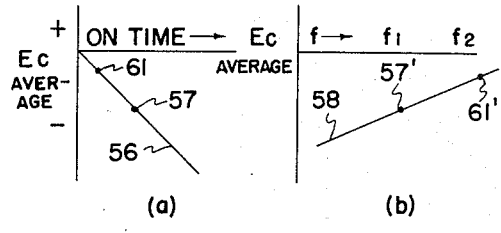
Fig. 4 is a plot relating the control characteristics of the time discriminator and the reactance modulator.
Figure 3:
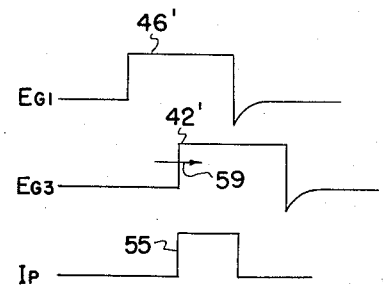
Fig. 3 is a time diagram useful in explaining the operation of the time discriminator.

When the signals generated in winding 23 are of the same frequency as those generated in oscillator 28, relative positions of pulses 46 and 42 are as shown by pulses 46′ and 42′, respectively, in Fig. 3, and the current flowing in tube 49 is represented by the diagram 55. For these conditions of operation the reactance tube is stabilized at its operating point, as will be more fully described in relation to Fig. 4. If for any reason the motor speed should change, the voltage generated in winding 23 would vary in phase such that the overlap of pulses 46′ and 42′, as shown in Fig. 3, would no longer obtain. The time duration of the overlap would either increase or decrease, resulting in a corresponding change in the time current flows in tube 49, thus resulting in a change in the voltage $E_c$ on condenser 53. The sense of this change is chosen to provide the correct adjustment in the reactance of the modulator 33 such that the frequency of oscillator 32 and thus the speed of motor 11 changes to restore the phase of the voltage generator in coil 23 to be such that the conditions of Fig. 3 once again obtain.

In Fig. 4a there is shown a characteristic 56 which represents the control voltage developed on condenser 53 as a function of the "on" time of tube 49 i. e. the duration of the current pulse in tube 49 corresponding to the overlap of the pulses 46 and 42. The reactance modulator 33 is arranged to operate with respect to an intermediate point 57 on the characteristic 56 which corresponds to the overlap conditions shown in Fig. 3. A frequency control characteristic 58 of the modulator 33 and oscillator 32 is shown in Fig. 4b. An intermediate operating point 57′, corresponding to point 57, maintains the frequency of oscillator 32 at a frequency $f_2$ such that the motor-generator produces signals in coil 23 bearing the desired relation to the frequency generated in oscillator 38.

The control provided by the system will be described by way of example. Assume that the motor 11 is operating under the control of the system and for some reason its rotational speed decreases. At slower speeds the time between successive pulses 42 is greater and with reference to the control condition represented in Fig. 3 the wider spaced pulses 42 would appear displaced in the direction of the arrow 59. The resulting decreased overlap would decrease the voltage $E_c$ to some point 61 on curve 56. The corresponding point 61′ on curve 58 increases the frequency of oscillator 32 to a value $f_2$ which would increase the speed of the motor 11 such that the frequency of generation of pulses in coil 23 is brought into constant phase displaced synchronism with those derived from the oscillator 38. A corresponding inverse control cycle obtains to prevent increases in the speed of motor 11.

It will be observed from the operation just described that the control signals for the system are derived with respect to the time range of the width of the pulses 46 and therefore may be obtained with a high degree of precision by means of suitably short duration pulses. This control is unimpaired by variations in the magnitude of the voltages generated in the oscillator 38 or the coil 23, provided only that the triggering of the blocking oscillators 39 and 45 is obtained. The wave shape of the voltages generated likewise has no bearing on the reliability of control, provided that the triggers 41 and 44 are derivable therefrom with the desired accuracy.

The random overlap of the pulses 42 and 46, when the motor 11 is rotating slower than its speed corresponding to a driving frequency of $f_1$, will not maintain an average value of voltage on condenser 53 which will provide equilibrium at that motor speed. The correction provided for such a deficiency of pulse overlaps will be such as to increase the motor speed. Once the motor is brought up to synchronous speed, the system is under the control of the conditions represented in Fig. 3.

Obviously many modifications of the embodiment herein described will be apparent in the light of above teachings and these are intended to be within the spirit and scope of the present invention.

What is claimed is:

1. A device for generating electrical energy of a frequency which is stabilized with a reference frequency comprising, a motor, an A. C. generator driven by said motor, means for providing a reference trigger fixed in phase position with respect to the frequency of said electrical energy, means for providing a reference trigger fixed in phase position with respect to said reference frequency, means responsive to the time interval between said triggers for producing a control signal representative of said interval, an oscillator, means impressing alternating current on said motor of frequency dependent upon the frequency of said oscillator for controlling the speed of said motor; and a reactance modulator for varying the frequency of said oscillator responsive to said control signal for affecting the speed of said motor to stabilize the frequency of said electrical energy.

2. A device for generating electrical energy of a frequency which is stabilized with a reference frequency comprising, a motor, an A. C. generator driven by said motor, means for providing a reference trigger fixed in phase position with respect to the frequency of said electrical energy, means for providing a reference trigger fixed in phase position with respect to said reference frequency, means for generating voltage pulses of predetermined duration in response to said triggers and individual thereto, means for generating a control signal representative of the time overlap of said pulses, an oscillator, means impressing alternating current on said motor of frequency dependent upon the frequency of said oscillator for controlling the speed of said motor and a reactance modulator for varying the frequency of said oscillator responsive to said control signal for affecting the speed of said motor to stabilize the frequency of said generated energy.

3. A device for generating electrical energy of a frequency which is stabilized with a reference frequency comprising, a motor, an A. C. generator driven by said motor, means for providing a reference trigger fixed in phase position with respect to the frequency of said electrical energy, means for providing a reference trigger fixed in phase position with respect to said reference frequency, means for generating voltage pulses of predetermined duration in response to said triggers and individual thereto, a coincidence circuit having two input circuits and one output circuit, said circuit being characterized by producing output signals only upon having said input circuits energized in time coincidence, circuit means for applying said pulses to respective ones of said input circuits and means responsive to said output signals for affecting the speed of said motor to stabilize the frequency of said generated energy.

4. A device for generating electrical energy of a frequency which is stabilized with a reference frequency comprising, a motor, an A. C. generator driven by said motor, means for providing a reference trigger fixed in phase position with respect to the frequency of said electrical energy, means for providing a reference trigger fixed in phase position with respect to said reference frequency, means for generating voltage pulses of predetermined duration in response to said triggers and individual thereto, a coincidence circuit having two input circuits and one output circuit, said circuit being characterized by producing output signals only upon having said input circuits energized in time coincidence, circuit means for applying said pulses to respective ones of said input circuits, a rectifier circuit, said rectifier circuit being connected to said ouput circuit and providing detection of the average value of said output signals over a predetermined averaging interval, and means responsive to said average value for affecting the speed of said motor to stabilize the frequency of said generated energy.

5. A device for generating electrical energy of a frequency which is stabilized with a reference frequency comprising, a motor, an A. C. generator driven by said motor, means for providing a reference trigger fixed in phase position with respect to the frequency of said electrical energy, means for providing a reference trigger fixed in phase position with respect to said reference frequency, means responsive to the time interval between said triggers for producing a control signal representative of said interval, an oscillator, means impressing alternating current on said motor of frequency dependent upon the frequency of said oscillator for controlling the speed of said motor; a reactance modulator for varying the frequency of said oscillator responsive to said control signal for affecting the speed of said motor to stabilize the frequency of said generated energy, and a second generator driven by said motor for generating a second frequency having a constant time-phase relative to the stabilized frequency of said energy.

6. The combination according to claim 5 and including means for adjusting the stator position of one of said generators to shift the time-phase of said second frequency with respect to said stabilized frequency.

7. A device for generating electrical energy of a frequency which is stabilized with a reference frequency comprising, a motor, an A. C. generator driven by said motor, means for providing a reference trigger fixed in phase position with respect to the frequency of said electrical energy, means for providing a reference trigger fixed in phase position with respect to said reference frequency, means for generating voltage pulses of predetermined duration in response to said triggers and individual thereto, a coincidence circuit having two input circuits and one output circuit, said circuit being characterized by producing output signals only upon having said input circuits energized in time coincidence, circuit means for applying said pulses to respective ones of said input circuits, a rectifier circuit, said rectifier circuit being connected to said output circuit and providing detection of the average value of said output signals over a predetermined averaging interval, an oscillator means impressing alternating current on said motor of frequency dependent upon the frequency of said oscillator for controlling the speed of said motor, and a reactance modulator for varying the frequency of said oscillator responsive to said average value for affecting the speed of said motor to stabilize the frequency of said electrical energy.

References Cited in the file of this patent

UNITED STATES PATENTS

| | | |
|---|---|---|
| 1,604,163 | Herman | Oct. 26, 1926 |
| 1,901,985 | Ranger | Mar. 21, 1933 |
| 2,419,637 | Gabriel et al. | Apr. 29, 1947 |